United States Patent
Belfield

(10) Patent No.: US 10,436,066 B2
(45) Date of Patent: Oct. 8, 2019

(54) DE-OILER AND A METHOD OF USING THE SAME

(71) Applicant: ROLLS-ROYCE plc, London (GB)

(72) Inventor: John Belfield, Derby (GB)

(73) Assignee: ROLLS-ROYCE plc, London (GB)

(*) Notice: Subject to any disclaimer, the term of this patent is extended or adjusted under 35 U.S.C. 154(b) by 291 days.

(21) Appl. No.: 15/170,302

(22) Filed: Jun. 1, 2016

(65) Prior Publication Data

US 2016/0376922 A1 Dec. 29, 2016

(30) Foreign Application Priority Data

Jun. 29, 2015 (GB) .................................. 1511321.0

(51) Int. Cl.
*F01D 25/18* (2006.01)
*B01D 46/00* (2006.01)

(52) U.S. Cl.
CPC ............ *F01D 25/18* (2013.01); *B01D 46/003* (2013.01); *B01D 46/0056* (2013.01)

(58) Field of Classification Search
CPC ............ B01D 46/0056; B01D 2273/30; B01D 45/14; B01D 46/0012; B01D 46/003; F01D 25/18; F01M 11/08; F05D 2220/32; F05D 2260/98
See application file for complete search history.

(56) References Cited

U.S. PATENT DOCUMENTS

| | | | | |
|---|---|---|---|---|
| 3,447,290 A * | 6/1969 | Flory | ..................... | B01D 45/14 55/322 |
| 4,049,401 A * | 9/1977 | Smith | ..................... | B01D 45/14 55/401 |
| 6,893,478 B2 * | 5/2005 | Care | ..................... | B01D 45/14 55/337 |
| 8,679,237 B2 * | 3/2014 | Angst | ..................... | B01D 45/14 55/408 |
| 9,194,265 B2 * | 11/2015 | Parikh | ..................... | F01M 13/04 |
| 2008/0078291 A1 | 4/2008 | Daukant | | |

(Continued)

FOREIGN PATENT DOCUMENTS

| | | | | |
|---|---|---|---|---|
| DE | 102011016893 | * | 10/2012 | ............ F01M 13/04 |
| EP | 0 217 344 A2 | | 4/1987 | |
| GB | 2519977 A | | 5/2015 | |

OTHER PUBLICATIONS

Oct. 19, 2015 Search Report issued in British Patent Application No. 1511321.0.

*Primary Examiner* — Jesse S Bogue
(74) *Attorney, Agent, or Firm* — Oliff PLC

(57) ABSTRACT

A de-oiler for separating oil from an air/oil mixture comprises a housing, and a rotatable porous element accommodated within the housing. The housing has a first axial face and a second, opposite, axial face, the first axial face being separated from the second axial face by an axial length.

The housing has an inlet positioned on the first axial face, a first outlet positioned on the second axial face, and a second outlet positioned on a radially outwardly facing surface. In use, the inlet is adapted to receive a first flow comprising an air/oil mixture, and rotation of the porous element separates the oil from the air/oil mixture, with the first outlet being adapted to exhaust a second flow comprising de-oiled air, and the second outlet being adapted to exhaust a third flow comprising separated oil.

14 Claims, 2 Drawing Sheets

(56) References Cited

U.S. PATENT DOCUMENTS

| | | | |
|---|---|---|---|
| 2013/0167816 A1* | 7/2013 | Dawar | F02M 25/06 123/573 |
| 2015/0176447 A1* | 6/2015 | Beier | F02C 7/06 415/110 |
| 2016/0138444 A1* | 5/2016 | Prunera-Usach | B01D 50/002 74/431 |
| 2018/0117512 A1* | 5/2018 | Janakiraman | B01D 45/14 |

* cited by examiner

DE-OILER AND A METHOD OF USING THE SAME

This disclosure claims the benefit of UK Patent Application No. 1511321.0, filed on 29 Jun. 2016, which is hereby incorporated herein in its entirety.

FIELD OF THE DISCLOSURE

The present disclosure relates to a de-oiler for a lubrication system and particularly, but not exclusively, to a de-oiler for a lubrication system of a gas turbine engine.

BACKGROUND TO THE DISCLOSURE

There are many internal air flows within a gas turbine. Some of these flows are oil laden. Examples of these oil laden flows are the vent lines from bearing compartments and gearbox housings.

For environmental reasons, and to reduce oil consumption, it is necessary to include some form of de-oiling in these oil laden flow lines.

A typical de-oiler consists of a rotating element that contains a porous medium. The rotating element is located within a stationary housing with appropriate seals. Oily air is admitted into the housing whereupon rotation of the rotating element causes the oil droplets to be centrifuged to the outer radius of the housing where they are collected as coalesced oil.

Air, being much less dense than oil, is able to flow though the rotating porous medium with much less impediment. This flow path of air can either be radially towards the centre of the de-oiler, or axially across the de-oiler. De-oiled air is collected and passed through the housing for use or disposal.

However, in such de-oiler arrangements, there is an appreciable pressure drop caused by the air having to pass through the porous medium. A further cause of pressure drop may result from the de-oiled air being exhausted at a smaller radius than that at which the oily air is admitted to the de-oiler.

This pressure drop can adversely affect the oil sealing performance of the assemblies from which the oil air is being exhausted. For example, the high back-pressure caused by the de-oiler may increase the pressure within a bearing chamber and thereby cause oil leaks through rotating seals.

STATEMENTS OF DISCLOSURE

According to a first aspect of the present disclosure there is provided a de-oiler for separating oil from an air/oil mixture, the de-oiler comprising:
- a housing comprising a first axial face and a second, opposite, axial face, the first axial face being separated from the second axial face by an axial length; and
- a rotatable porous element accommodated within the housing,
- the housing comprising:
- an inlet positioned on the first axial face;
- a first outlet positioned on the second axial face; and
- a second outlet positioned on a radially outwardly facing surface of the housing,
- wherein, the housing further comprises a first stator vane array positioned within the first outlet, wherein the first stator vane array has a plurality of first stator vanes, the plurality of first stator vanes being arranged as a circumferential array and, in use, the inlet is adapted to receive a first flow comprising an air/oil mixture, and rotation of the porous element separates the oil from the air/oil mixture, with the first outlet being adapted to exhaust a second flow comprising de-oiled air, and the second outlet being adapted to exhaust a third flow comprising separated oil.

The presence of a first stator vane array positioned downstream of the rotating porous element causes most of the rotational kinetic energy to be transformed into a pressure rise by the action of de-swirling and diffusing the flow.

This results in the de-oiler of the present disclosure having a lower pressure drop between the inlet and the first outlet than for conventional rotating element de-oilers. This makes the de-oiler of the present disclosure more efficient than prior art de-oilers.

Optionally, an axial length of the porous element is within the range (0.5 and 1.0)*D, where D is the outer diameter of the porous element.

An axial length of the porous element within the range (0.5 and 1.0)*D enables the porous element to more effectively add kinetic energy to the incoming oil/air mixture, which in turn improves the efficiency of the de-oiler at separating the entrained oil from the air flow.

Optionally, the porous element is formed from a material having a porosity, or pore-volume fraction, within the range 30% to 70%.

Optionally, the porous element is formed from a material having a porosity, or pore-volume fraction, within the range 40% to 60%.

The selection of a pore-volume fraction for the porous element is a balance between providing sufficient porosity to allow for the ingestion of oil/air mixture, and generating sufficient rotational kinetic energy to effectively separate the entrained oil from the incoming air flow.

Optionally, the porous element is formed from a material selected from the group comprising metallic foams, sintered metal powders or fibres, zeolites, ceramic foams, and sintered ceramics.

By forming the porous element from a material selected from the group comprising metallic foams, sintered metal powders or fibres, zeolites, ceramic foams, and sintered ceramics, the mechanical rigidity of the material assists in withstanding deformation resulting from the rotary motion of the porous element. This enables the porous element to perform its separation function over the performance envelope of the de-oiler.

Optionally, each of the plurality of first stator vanes has a radial profile selected from the group comprising linear, single curvature, volute, and involute.

The use of a single curvature radial profile for the first stator vanes makes the corresponding stator vane array more efficient at de-swirling the de-oiled air flow than an array on radially linear stator vanes. However, this improvement in de-swirling capability must be balance against the increased cost and complexity of curved vanes over linear vanes.

Optionally, the first stator vane array comprises between six and twelve first stator vanes.

Optionally, the first stator vane array is positioned a distance of between 0.5*D and 1.5*D downstream of a downstream axial surface of the porous element, where D is the outer diameter of the porous element.

By positioning the first stator vane array close to the first exit of the housing, the flow of de-oiled air exiting the de-oiler is prevented from stabilising, which makes the de-swirling effect of the first stator vane array more effective.

Optionally, the de-oiler further comprises a second stator vane array positioned within the inlet, wherein the second stator vane array has a plurality of second stator vanes, the plurality of second stator vanes being arranged as a circumferential array.

The use of a second stator vane array upstream of the inlet to the housing enables the flow of the air/oil mixture to be smoother prior to its ingestion by the de-oiler. This improves the efficiency of the de-oiler.

Optionally, each of the plurality of second stator vanes has a radial profile selected from the group comprising linear, single curvature, volute, and involute.

In one arrangement, the second stator vane array comprises a plurality of radially linear stator vanes. This arrangement is simple and cost-effective to manufacture and provides a measure of flow stabilisation to the incoming oil/air mixture.

In other arrangements, each of the second stator vanes may have a radially curved (single curvature, involute or volute) profile. This may provide improved flow stabilisation but makes the second vane array more expensive and complex to manufacture.

Optionally, the second stator vane array comprises between six and twelve second stator vanes.

Optionally, the second stator vane array is positioned a distance of between 1.5*D and 3.5*D upstream of an upstream axial surface of the porous element, where D is the outer diameter of the porous element.

The positioning of the second stator vane array a distance of between 1.5*D and 3.5*D upstream of an upstream axial surface of the porous element provides for a smoothing of the flow of the air/oil mixture into the inlet of the housing. This in turn increases the efficiency of the de-oiler by increasing the volume of air that can be ingested through the inlet.

According to a second aspect of the present disclosure there is provided a method of separating oil from an air/oil mixture using a de-oiler, the de-oiler comprising a housing and a rotatable porous element, the housing comprising a first axial face and a second, opposite, axial face, and the porous element accommodated within the housing, an inlet positioned on the first axial face, a first outlet positioned on the second axial face, and a second outlet positioned on a radially outwardly facing surface of the housing, wherein, the housing further comprises the method comprising the steps of:
(i) providing the housing with a first stator vane array positioned within the first outlet, wherein the first stator vane array has a plurality of first stator vanes, the plurality of first stator vanes being arranged as a circumferential array;
(ii) admitting a first flow of an air/oil mixture into the inlet;
(iii) rotating the porous element in the housing at a pre-determined rotational speed;
(iv) exhausting a second flow of de-oiled air from the first outlet; and
(v) collecting a flow of separated oil from the second outlet.

According to a third aspect of the present disclosure there is provided turbofan engine comprising a de-oiler according to the first aspect of the disclosure.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
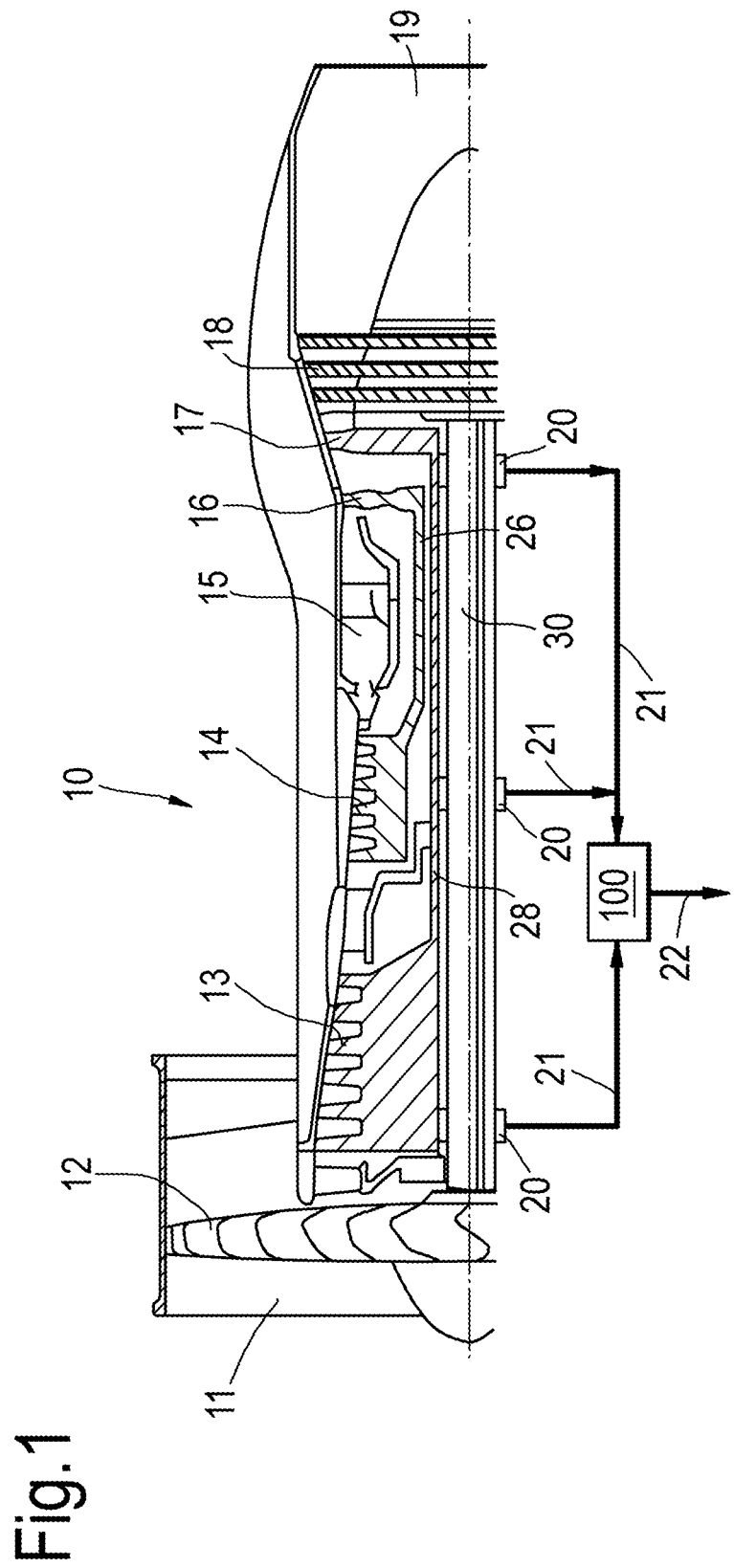
FIG. 1 shows a schematic partial sectional view of a turbofan engine comprising a de-oiler according to an embodiment of the disclosure.
Figure 2:
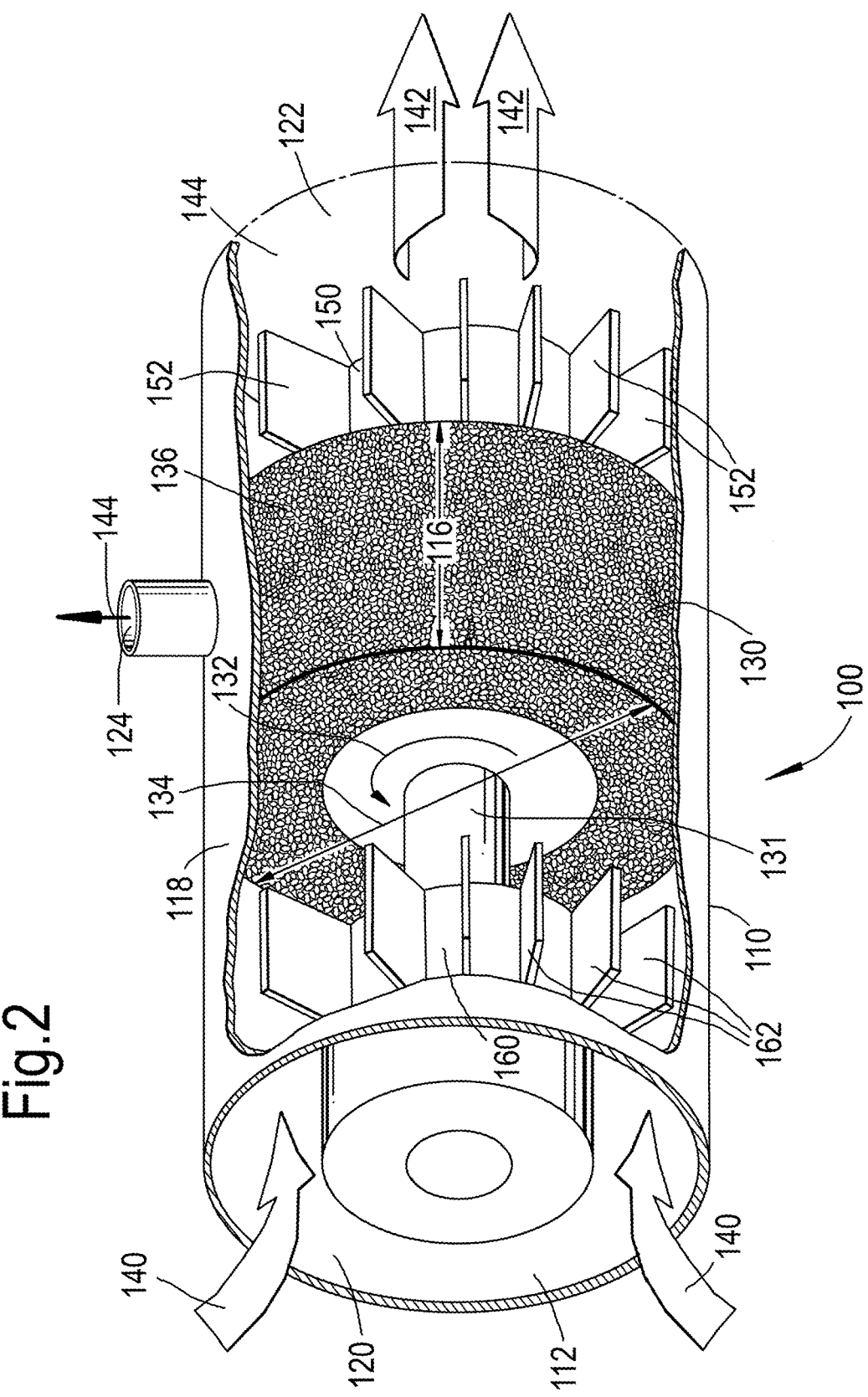
FIG. 2 shows a schematic perspective sectional view of the de-oiler of FIG. 1.

Referring to FIGS. 1 and 2, a de-oiler according to a first embodiment of the disclosure is designated generally by the reference numeral 100.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Each of the first, second and third shafts 26,28,30 are supported in bearings 20. Each of these bearings 20 is provided with a vent line 21 that is fluidly connected to a de-oiler 100.

The de-oiler 100 comprises a housing 110 and a rotatable porous element 130. The porous element 130 is driven rotatably by a shaft 131, which in turn is powered by an accessory drive (not shown) from the engine 10.

The housing 110 comprises a first axial face 112, and a second opposite axial face 114, the first axial face 112 being separated from the second axial face 114 by an axial length 116.

The porous element 130 is accommodated within the housing 110.

The housing 110 comprises an inlet 120 positioned on the first axial face 112, a first outlet 122 positioned on the second axial face 114, and a second outlet 124 positioned on a radially outwardly facing surface 118 of the housing 110.

Typically, the housing 110 is formed as a metal casting, which is then finished machined. Alternatively, the housing may be formed by sintering or additive layer manufacturing, or from a fibre-reinforced composite material.

The porous element 130 is formed from a zinc-alloy foam material having a porosity, or pore-volume fraction, of 60%. In other words, 60% of the volume of the porous element 130 is pore space, and correspondingly, 40% of the volume of the porous element 130 is solid material.

The housing 110 further comprises a first stator vane array 150 comprising a circumferential array of eight first stator vanes 152. The first stator vane array 150 is positioned a distance of 0.5*D and 1.5*D downstream of a downstream axial surface of the porous element, where D is the outer diameter 134 of the porous element 130.

Each of the first stator vanes 152 is formed with a single curvature radial profile. In other words, each of the first stator vanes 152 has a single radiussed curvature in the radial direction.

The first stator vanes 152 are conventionally formed from a metal alloy. In other arrangements of the disclosure, the vanes of the first stator vane array may be formed from an alternative material such as, for example, a fibre-reinforced composite material.

The housing 110 further comprises a second stator vane array 160 comprising a circumferential array of eight second stator vanes 162. The second stator vane array 160 is positioned a distance of 1.5*D and 3.5*D upstream of an upstream axial surface of the porous element 130, where D is the outer diameter 134 of the porous element 130.

The array 160 of second stator vanes is formed with each second stator vane 162 having radially linear profile. In other words, each of the second stator vanes 162 extends linearly in the radial direction.

Each of the second stator vanes 162 is conventionally formed from a metal alloy. Alternatively, in other arrangements, the second stator vanes 162 may be formed from an alternative material such as, for example, a fibre-reinforced composite material.

In use, a first flow 140 of the oil/air mixture is drawn into the de-oiler 100 via the inlet 110 and the first stator vane array 150. The rotation 132 of the shaft 131 driving the porous element 130 swirls the entering oil/air mixture 140 up to the peripheral speed of the porous element 130.

The oil that is entrained in the oil/air mixture 140, being denser than the air is separated from the mixture 140 and thrown centrifugally outwards where is trapped by the radially outwardly facing surface 118 of the housing 110. The radially outwardly facing surface 118 is profiled to cause the separated oil to be directed as a third flow through the second outlet 124. From here the separated oil can be returned to the engine's oil circulation system (not shown).

A second flow 142 of the de-oiled air is then exhausted via the second stator vane array 160 through the second outlet 124. This de-oiled air flow 142 may then be exhausted to the atmosphere. Alternatively, the second flow 142 may be returned to another part of the engine.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A de-oiler for separating oil from an air/oil mixture, the de-oiler comprising:
    a stationary housing including a first axial face and a second, opposite, axial face, the first axial face being separated from the second axial face by an axial length; and
    a rotatable porous element accommodated within the stationary housing between the first axial face and the second axial face,
    the stationary housing including:
        an inlet positioned on the first axial face;
        a first outlet positioned on the second axial face;
        a second outlet positioned on a radially outwardly facing surface of the stationary housing; and
        a first stator vane array positioned within the first outlet, the first stator vane array having an axial upstream end and an axial downstream end in an axial direction, the first stator vane array being spaced from the porous element such that the upstream end and the downstream end of the first stator vane array are each exposed, the first stator vane array being located downstream of the porous element towards the second axial face of the stationary housing, the first stator vane array having a plurality of first stator vanes, the plurality of first stator vanes being arranged as a circumferential array, each of the plurality of first stator vanes being curved in a radial direction,
    wherein, in use, the inlet is configured to receive a first flow of an air/oil mixture, and the porous element is configured to rotate to separate the oil from the air/oil mixture, with the first outlet being configured to exhaust a second flow of de-oiled air, and the second outlet being configured to exhaust a third flow of separated oil.

2. The de-oiler as claimed in claim 1, wherein an axial length of the porous element is within a range between 0.5*D and 1.0*D, where D is an outer diameter of the porous element.

3. The de-oiler as claimed in claim 1, wherein the porous element is formed from a material having a porosity, or pore-volume fraction, within a range 30% to 70%.

4. The de-oiler as claimed in claim 1, wherein the porous element is formed from a material having a porosity, or pore-volume fraction, within a range 40% to 60%.

5. The de-oiler as claimed in claim 1, wherein the porous element is formed from a material selected from the group comprising metallic foams, sintered metal powders or fibres, zeolites, ceramic foams, and sintered ceramics.

6. The de-oiler as claimed in claim 5, wherein each of the plurality of first stator vanes has a profile in the radial direction selected from the group comprising single curvature, volute, and involute.

7. The de-oiler as claimed in claim 1, wherein the first stator vane array includes between six and twelve first stator vanes.

8. The de-oiler as claimed in claim 1, wherein the first stator vane array is positioned a distance of between 0.5*D and 1.5*D downstream of a downstream axial surface of the porous element, where D is an outer diameter of the porous element.

9. The de-oiler as claimed in claim 1, further comprising a second stator vane array positioned within the inlet, wherein the second stator vane array has a plurality of second stator vanes, the plurality of second stator vanes being arranged as a circumferential array.

10. The de-oiler as claimed in claim 9, wherein each of the plurality of second stator vanes has a profile in the radial direction selected from the group comprising linear, single curvature, volute, and involute.

11. The de-oiler as claimed in claim 9, wherein the second stator vane array includes between six and twelve second stator vanes.

12. The de-oiler as claimed in claim 9, wherein the second stator vane array is positioned a distance of between 1.5*D and 3.5*D upstream of an upstream axial surface of the porous element, where D is an outer diameter of the porous element.

13. A method of separating oil from an air/oil mixture using a de-oiler, the de-oiler including a stationary housing and a rotatable porous element, the housing including: (1) a first axial face and a second, opposite, axial face, and the porous element accommodated within the stationary housing between the first axial face and the second axial face, (2) an inlet positioned on the first axial face, (3) a first outlet positioned on the second axial face, and (4) a second outlet positioned on a radially outwardly facing surface of the stationary housing, the method comprising steps of:
  (i) providing the stationary housing with a first stator vane array positioned within the first outlet, the first stator vane array having an axial upstream end and an axial downstream end in an axial direction, the first stator vane array being spaced from the porous element such that the upstream end and the downstream end of the first stator vane array are each exposed, the first stator vane array being located downstream of the porous element towards the second axial face of the stationary housing, the first stator vane array having a plurality of first stator vanes, the plurality of first stator vanes being arranged as a circumferential array, each of the plurality of first stator vanes being curved in a radial direction;
  (ii) admitting a first flow of an air/oil mixture into the inlet;
  (iii) rotating the porous element in the stationary housing at a pre-determined rotational speed to separate oil from the air/oil mixture;
  (iv) exhausting a second flow of de-oiled air from the first outlet;
  (v) exhausting a third flow of separated oil from the second outlet; and
  (vi) collecting the flow of separated oil from the second outlet.

14. A turbofan engine comprising the de-oiler as claimed in claim 1.

* * * * *